Figure 1:
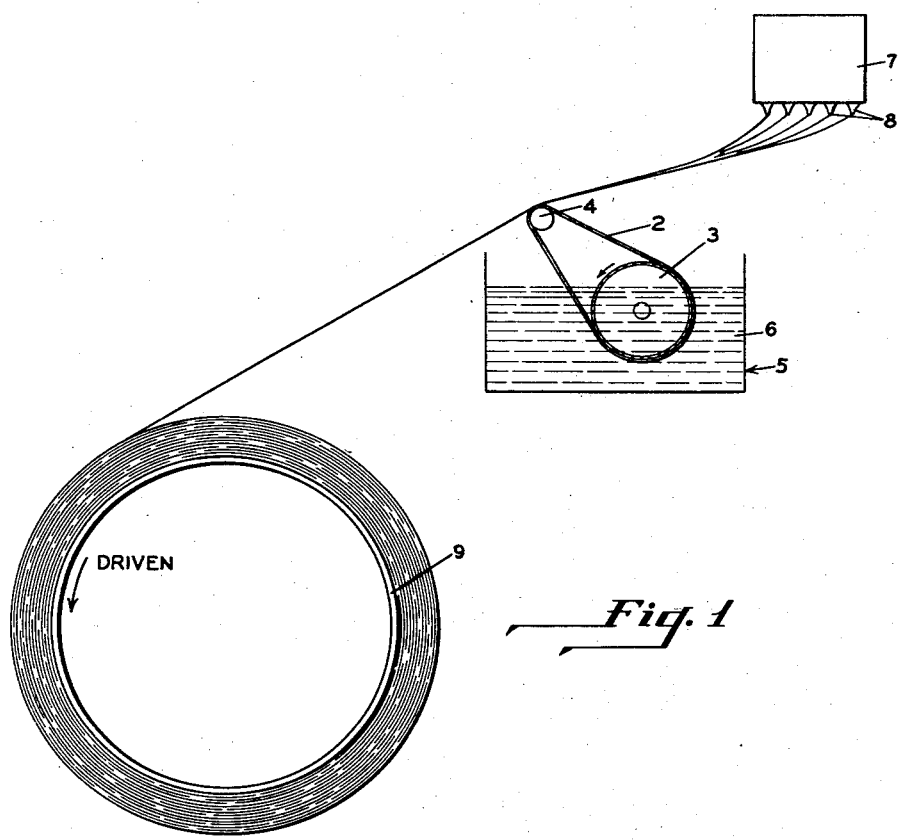

Nov. 4, 1958 R. S. OLCOTT, JR 2,859,133
TREATMENT OF STRAND MATERIALS AND THE LIKE
Filed Feb. 14, 1956

INVENTOR
ROBERT S. OLCOTT, JR.

ATTORNEY

United States Patent Office 2,859,133
Patented Nov. 4, 1958

2,859,133

TREATMENT OF STRAND MATERIALS AND THE LIKE

Robert S. Olcott, Jr., Manor Township, Lancaster County, Pa., assignor to Armstrong Cork Company, Lancaster, Pa., a corporation of Pennsylvania Application February 14, 1956, Serial No. 565,338

4 Claims. (Cl. 117—112)

This invention relates to a method and apparatus for applying aqueous materials to a surface to be treated and is concerned more particularly with a method and apparatus for applying an aqueous treating material, such as a solution, dispersion, or emulsion, to the surface of strand material such as glass filaments.

In the production of glass filaments, a molten glass batch is delivered to a platinum die having very fine openings in the bottom thereof. The molten glass is drawn through the dies as fine continuous multiple filament strands which are wound onto a suitable core for further fabrication. The glass filaments are drawn at an extremely high rate, often approximating 5000 feet per minute. It is desirable to surface treat the glass filaments as they are formed, before they are wound onto the cores. As an illustration, it is frequently desirable to apply an aqueous solution or dispersion of starch as a size to the surface of the fibers. In other instances, a chromate size is applied to enhance the bond of resinous materials to the surface of the glass filaments in the manufacture of automobile body parts, small boat hulls, and other services. The treating materials are frequently in the form of emulsions.

It has been found to be quite difficult and expensive to treat properly the moving glass filaments as they are formed. Felt pads dipped in the treating material have been tried but found to be lacking in adequate control of the amount of treating solution applied. Transfer rolls covered with conventional rubber compounds have been tried, but these have failed, principally because it has not been possible to uniformly coat the fibers at the high speed of filament attenuation. Another problem has been the rapid cutting of the rubber roll surfaces by the fine glass filaments which, of course, are moving over the roll surface at a high rate of speed. It is not feasible to rotate the rolls at a speed adequate to provide a surface speed equal to the 5000 feet per minute linear speed of the fibers. If the filaments remove the treating solution from the roll too rapidly to permit the solution to flow from adjacent areas to cover the exposed roll surface, the glass filaments instantly cut into the surface. Under severe conditions, a rubber roll may have a useful life of two hours or less and, under less stringent conditions, may last for a few hours more.

An object of the present invention is to provide a method and apparatus for applying aqueous material to a surface to be treated which will result in a more uniform application and better control of application.

Another object of the invention is to provide a method and apparatus for applying aqueous material to strands such as glass filaments which will be effective and economical in operation and will minimize damage to the surface of the transfer element which carries the treating material to the strands to be picked up by the strands.

Other objects of the invention will be clear from the detailed description of an embodiment of the invention which will follow.

It has been found that the incorporation of a water-soluble surface-active material into an elastomeric compound with which the surface-active material is at least partially compatible so alters the physical characteristics of the transfer surface of the compound that even at a high speed of relative motion between the transfer surface and the glass filaments or other material being treated a uniform and controlled amount of treating solution is applied. It also minimizes the "cutting" mentioned previously.

Figure 2:
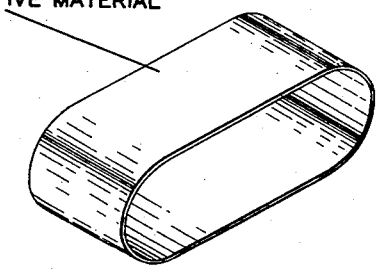

In order that the invention may be readily understood, an embodiment will be described in conjunction with the attached drawing, in which:

Figure 1 is a diagrammatic view illustrating the method and apparatus of the invention; and Figure 2 is a perspective view showing a transfer apron.

The unit shown in Figure 1 comprises a transfer element 2 in the form of an apron. The apron is trained around a driven roll 3 which is preferably knurled to provide good driving engagement with the inner surface of the apron. A stationary nose bar 4 is also provided for guiding the apron. The apron may be 3" in inside diameter, 1" wide, and about .035" to .040" thick. The roll is mounted for rotation in a tank 5 which contains the aqueous treating solution. This has been indicated at 6. The roll may be about 1½" in diameter and may be rotated at about 50 revolutions per minute.

A conventional glass filament drawing unit has been shown diagrammatically in Fig. 1. It includes a receptacle 7 for the reception of molten glass. A pluraltiy of platinum dies 8 are provided in the bottom of the receptacle. The molten glass is delivered through the dies and is wound onto a core 9 which is driven in the direction of the arrow by any suitable power source such as an electric motor (not shown) to impart the desired speed of attenuation to the glass filaments. A typical example would be a linear speed of about 5000 feet per minute.

The filaments are passed over and in engagement with the surface of the apron 2, and the treating solution carried by the apron is transferred to the surface of the filaments. The amount of treating solution applied may be controlled by the speed of movement of the apron 2 relative to the speed of movement of the filaments. The nature of the treating solution, the size of the glass filaments being drawn, the surface characteristics of the filaments, and other variable factors all will have an effect on the quantity of treating solution applied to the filaments.

The nature of the transfer surface of the apron 2 is an important factor in the successful operation of the invention. It has been found that it is essential to permanently incorporate into the composition from which the apron is formed at least two parts by weight of a water-soluble surface-active material for each 100 parts by weight of the matrix material from which the composition is formed, such as synthetic rubber or other elastomeric material. Any surface-active material which is at least partially compatible with the matrix material so as not to undesirably "sweat out" of the composition, which is water-soluble, that is soluble in the aqueous treating solution at the service temperatures employed, generally about 80° F. or above, up to the boiling point of the solution, but not frequently above 120° F., may be used. The anionic, cationic, and nonionic surface-active materials listed in "Synthetic Detergents and Emulsifiers—Up To Date III, 1955" by John W. Mc-
Cutcheon, reprinted from "Soap and Chemical Specialties," July, August, September, and October 1955 issues, which meet the physical requirements outlined above, of which there are hundreds, may be used singly or in various admixtures. The particular surface-active material selected is not critical to operation of the invention. The proportioning of the surface-active material to elastomeric material is not critical either, although less than two parts per 100 parts of elastomer is inadequate to provide significant improvement in the working characteristics of the transfer surface. Generally 70 parts of surface-active material per 100 parts of elastomer will be a good upper working limit. Some of the cationic surface-active materials are known to "scorch" rubber compounds; and these, of course, will be used in smaller amounts than the nonionic materials, for example where rubber, either natural or synthetic, is used in the matrix. The rubber compounder will be able to determine optimum quantities of surface-active material to use with any particular elastomer and any given surface-active material or mixture of surface-active materials.

The following is an example of a suitable compound for manufacture of the apron 2:

| | Parts by weight |
|---|---|
| Matrix material | 110 |
| Curing agent | 8 |
| Stearic acid | 1 |
| Reinforcing filler | 60 |
| Surface-active material | 10 |

The matrix material may be made up of 100 parts of butadiene-acrylonitrile rubber and 10 parts of cumar resin. The curing agent may consist of zinc oxide 5 parts with 3 parts of Tuads (tetramethyl thiuram disulfide), a vulcanization promoter. Carbon black is the preferred reinforcing filler. The surface-active material may be 10 parts of Nonisol 100, a polyethylene glycol (400) monolaurate compound sold by Geigy Chemical Corporation.

In the preparation of the apron, the synthetic rubber is masticated on a two-roll mill, and the reinforcing filler and surface-active material are mixed into the rubber. The curing agent and stearic acid are then added. The milled mass is delivered to an extruder, and a tube of the desired diameter and wall thickness is formed. This tube of a desired length, say 4', is positioned upon a mandrel, wet fabric wrapped, and cured in open steam at about 305° F. for about fifty minutes. The outer surface of the tube is then ground to provide a desired surface finish, and the tube is cut into aprons of the desired width.

In place of butadiene-acrylonitrile rubber, many other water-insoluble elastomeric materials may be employed, such as natural rubber, butadiene-styrene type rubbers, polyvinyl chloride compositions (Koroseal), and the like, as well as mixtures of elastomeric materials. This class of matrix materials is generally referred to as elastomeric materials or elastomers.

Various vulcanization systems may be used, including sulfur, as well as sulfur-free cures. Fillers other than carbon black may be used; and, of course, gum stocks may be employed. The essential elements of the treating surface are the water-insoluble elastomeric material and the water-soluble surface-active material which is permanently combined with the elastomeric material and thus is available at the transfer surface regardless of the extent of wear of the apron or other transfer element.

The water-soluble surface-active materials which are useful in the practice of this invention are well-known in the art. They are classified as anionic, cationic, and nonionic and are chemically defined in the literature. A chemical classification of surface-active agents appears at pages 33–38 in "Encyclopedia of Surface-Active Agents," by J. P. Sisley, copyright 1952, Chemical Publishing Co., Inc., New York, New York, and reference to that publication is made for a complete listing and classification of surface-active agents comprehended within the scope of the invention.

I claim:

1. In a device for applying an aqueous treating solution to the surface of a material to be treated, the combination of a treating element disposed in a treating station, a treating surface on said element comprising a water-insoluble elastomeric material having substantially uniformly incorporated therein as a permanent active ingredient available at said treating surface 2–70 parts by weight for each 100 parts by weight of said elastomeric material of a water-soluble surface-active material which is at least partially soluble in said elastomeric material, means for wetting said treating surface with said aqueous treating solution, means for moving said treating surface in said treating station to present fresh areas of said treating surface wetted with said aqueous treating solution to said material to be treated, and means for delivering said material to be treated through said treating station at a high speed relative to said wetted treating surface and in engagement therewith.

2. In a device for applying an aqueous treating solution to the surface of strand material to be treated, the combination of a treating element disposed in a treating station, a treating surface on said element comprising a vulcanized rubber compound having substantially uniformly incorporated therein as a permanent active ingredient available at said treating surface 2–70 parts by weight for each 100 parts by weight of rubber of a water-soluble surface-active material which is at least partially soluble in said rubber, means for wetting said treating surface with said aqueous treating solution, means for moving said treating surface in said treating station to present fresh areas of said treating surface wetted with said aqueous treating solution to said strand material to be treated, and means for delivering said strand material to be treated through said treating station at a high speed relative to said wetted treating surface and in engagement therewith.

3. In a method of applying an aqueous treating solution to the surface of a material to be treated, the steps comprising wetting with said aqueous treating material the surface of a water-insoluble elastomeric material having substantially uniformly incorporated therein as a permanent active ingredient available at said treating surface 2–70 parts by weight for each 100 parts by weight of said elastomeric material of a water-soluble surface-active material which is at least partially soluble in said elastomeric material, moving said treating surface to present fresh areas of said treating surface wetted with said aqueous treating solution to said material to be treated, and delivering said material to be treated at a high speed relative to said wetted treating surface and in engagement therewith to transfer aqueous treating solution from said treating surface to said material to be treated.

4. In a method of applying an aqueous treating solution to the surface of strand material to be treated, the steps comprising dipping a moving treating element into a bath of said aqueous treating solution to coat a transfer surface on said treating element with said treating solution, said transfer surface comprising a water-insoluble elastomeric material having substantially uniformly incorporated therein as a permanent active ingredient available at said treating surface 2–70 parts by weight for each 100 parts by weight of said elastomeric material of a water-soluble surface-active material which is at least partially soluble in said elastomeric material, moving said treating surface to present fresh areas of treating surface wetted with said aqueous treating solution to said strand material to be treated, and delivering said strand material to be treated at a high speed relative to said wetted treating surface and in engagement therewith to transfer aqueous treating solution from said treating surface to said strand material.

References Cited in the file of this patent

UNITED STATES PATENTS

| | | |
|---|---|---|
| 61,833 | Hill | Feb. 5, 1867 |
| 2,098,662 | Haskins | Nov. 9, 1937 |
| 2,147,680 | Stevens | Feb. 21, 1939 |
| 2,368,522 | Cornell | Jan. 30, 1945 |
| 2,386,764 | Zwicker | Oct. 16, 1945 |
| 2,390,370 | Hyde | Dec. 4, 1945 |
| 2,489,743 | Brogden | Nov. 29, 1949 |
| 2,728,972 | Drummond et al. | Jan. 3, 1956 |

FOREIGN PATENTS

| | | |
|---|---|---|
| 555,481 | Great Britain | Aug. 25, 1943 |
| 676,592 | Great Britain | July 30, 1952 |